United States Patent
Krupenkin et al.

(10) Patent No.: US 9,312,792 B2
(45) Date of Patent: Apr. 12, 2016

(54) APPARATUS FOR CLOSED-LOOP MECHANICAL ENERGY HARVESTING

(71) Applicants: Thomas Nikita Krupenkin, Madison, WI (US); Joseph Ashley Taylor, Madison, WI (US)

(72) Inventors: Thomas Nikita Krupenkin, Madison, WI (US); Joseph Ashley Taylor, Madison, WI (US)

(*) Notice: Subject to any disclaimer, the term of this patent is extended or adjusted under 35 U.S.C. 154(b) by 204 days.

(21) Appl. No.: 13/859,824

(22) Filed: Apr. 10, 2013

(65) Prior Publication Data

US 2013/0270839 A1    Oct. 17, 2013

Related U.S. Application Data

(60) Provisional application No. 61/622,598, filed on Apr. 11, 2012.

(51) Int. Cl.
*F02B 63/04*    (2006.01)
*H02N 99/00*    (2006.01)
*H02N 11/00*    (2006.01)

(52) U.S. Cl.
CPC .............. *H02N 99/00* (2013.01); *H02N 11/002* (2013.01)

(58) Field of Classification Search
CPC .............................. H02N 11/002; H02N 99/00
USPC .......... 290/1 R; 310/11, 12.12; 417/410.1, 92
See application file for complete search history.

(56) References Cited

U.S. PATENT DOCUMENTS

| | | | | |
|---|---|---|---|---|
| 2,698,127 A | * | 12/1954 | Bowlus | 417/92 |
| 3,453,462 A | * | 7/1969 | Dunning, Jr. et al. | 310/11 |
| 3,927,329 A | * | 12/1975 | Fawcett et al. | 290/1 R |
| 4,197,715 A | * | 4/1980 | Fawcett et al. | 62/115 |
| 4,321,020 A | * | 3/1982 | Mittal | 417/320 |
| 5,001,357 A | | 3/1991 | Adams | |
| 6,982,501 B1 | | 1/2006 | Kotha et al. | |
| 7,105,935 B2 | * | 9/2006 | Hsu | 290/2 |
| 7,467,928 B2 | | 12/2008 | Fakunle et al. | |
| 7,898,096 B1 | * | 3/2011 | Krupenkin | 290/1 R |
| 7,989,197 B2 | | 8/2011 | Yoo et al. | |
| 8,053,914 B1 | | 11/2011 | Krupenkin | |
| 8,258,644 B2 | | 9/2012 | Kaplan | |
| 2003/0151258 A1 | | 8/2003 | Shin | |
| 2005/0167987 A1 | * | 8/2005 | Perlo et al. | 290/1 R |
| 2006/0077762 A1 | * | 4/2006 | Boland et al. | 367/170 |
| 2009/0241537 A1 | * | 10/2009 | Browne et al. | 60/527 |
| 2009/0283407 A1 | | 11/2009 | Shah et al. | |
| 2011/0008767 A1 | | 1/2011 | Durack | |
| 2011/0037325 A1 | * | 2/2011 | Ciocanel et al. | 310/11 |
| 2011/0204653 A1 | | 8/2011 | Liu et al. | |

(Continued)

*Primary Examiner* — Julio C. Gonzalez Ramirez
(74) *Attorney, Agent, or Firm* — Wendy W. Koba

(57) ABSTRACT

A closed-loop apparatus for converting mechanical energy into electrical energy utilizes a closed-loop channel including sections of different cross-section (including a first group of sections having a constrained cross-section and a second group sections having an enlarged cross-section). An energy-producing configuration (such as coils and/or electrodes) is formed to surround at least a portion of the channel. A closed-loop chain of energy-producing elements is positioned in channel such that when the chain moves along the channel, the mechanical motion generates electrical energy. The chain is formed to include a set of expandable assemblies that change in dimension as they pass through the different cross-section areas of the channel. An inert fluid is injected into the channel at one or more locations by a mechanical force, resulting in the creation of a pressure-induced force differential that initiates and maintains the movement of the chain with respect to the channel.

22 Claims, 14 Drawing Sheets

(56) References Cited

U.S. PATENT DOCUMENTS

| | | |
|---|---|---|
| 2012/0091004 A1 | 4/2012 | Abell et al. |
| 2012/0292915 A1 | 11/2012 | Moon |
| 2013/0140917 A1* | 6/2013 | Krupenkin et al. ............. 310/11 |
| 2014/0049049 A1* | 2/2014 | Krupenkin et al. ........... 290/1 A |

* cited by examiner

APPARATUS FOR CLOSED-LOOP MECHANICAL ENERGY HARVESTING

CROSS-REFERENCE TO RELATED APPLICATIONS

This application claims the benefit of U.S. Provisional Application No. 61/622,598, filed Apr. 11, 2012 and herein incorporated by reference.

TECHNICAL FIELD

The present invention relates to a mechanical arrangement for harvesting energy from activities such as walking or running, using a closed-loop harvesting arrangement that may be embedded within the sole of a shoe.

BACKGROUND OF THE INVENTION

Currently, the majority of autonomous and mobile electronic systems are powered by electrochemical batteries. Although battery quality has substantially improved over the last two decades, their energy density has not greatly increased. At the present time, issues such as cost, weight, limited service time and waste disposal (all intrinsic to batteries) are impeding the advance of many areas of electronics. The problem is especially acute in the area of portable electronic devices, where rapidly growing performance and sophistication of mobile electronic devices leads to ever-increasing power demands that electrochemical batteries are unable to meet.

One of the technologies that holds great promise to substantially alleviate current reliance on the electrochemical batteries is high-power energy harvesting. The concept of energy harvesting works toward developing self-powered devices that do not require replaceable power supplies. In cases where high mobility and high output power are required, harvesters that convert mechanical energy into electrical energy are particularly promising, inasmuch as they can tap into a variety of high power density energy sources, including human locomotion.

High power harvesting of mechanical energy is a long-recognized concept that has not been commercialized in the past due to the lack of a viable energy harvesting technology. Traditional methods of mechanical-to-electrical energy conversion such as electromagnetic, piezoelectric or electrostatic do not allow for effective "direct coupling" to the majority of high-power environmental mechanical energy sources. Bulky and/or expensive mechanical or hydraulic transducers are often required to convert a broad range of aperiodic forces and displacements typically encountered in nature into a force accessible for conversion using those methods.

Recently, a new approach to energy harvesting has been demonstrated. In particular, a high-power, microfluidics-based energy harvester has been developed, as disclosed in U.S. Pat. Nos. 7,898,096 and 8,053,914 issued to the present inventors and incorporated herein in their entirety. The energy harvester as disclosed in this prior work generates electrical energy through the interaction of thousands of microscopic fluid droplets with a network of thin-film electrodes, where this combination has been found to be able to generate several watts of power. In one preferred embodiment, a train of energy-producing droplets is disposed in a thin channel and is hydraulically actuated by a force differential applied to the opposing ends of the channel. This type of energy generation provides an important advantage as it allows efficient direct coupling with a wide range of high-power environmental mechanical energy sources, including human locomotion.

A method for energy harvesting using microfluidic devices that improves upon the above-described arrangement is based on a synergistic combination of these techniques with the classical magnetic method of electrical power generation (based on Faraday's law of electromagnetic induction), as described in our co-pending application Ser. No. 13/352,588 filed Jan. 18, 2012 and incorporated by reference herein. The resulting approach has a number of substantial advantages over the prior arrangements, including its ability to provide for greatly increased power output, providing effective energy generation without requiring the use of external bias voltage sources. The ability to eliminate the need for external bias voltage sources improves the harvester performance characteristics, enhances its reliability and simplifies the harvester design when compared to the other prior art arrangements.

While the above-described energy generation methods have proven the ability to generate useable amounts of electrical energy (on the order of watts) from harvesting mechanical energy (such as human locomotion), some shortcomings still remain. In particular, no provision is made in any of these arrangements for allowing a continuous, revolving motion of the chain of energy-producing elements within a closed-loop, energy-producing channel.

SUMMARY OF THE INVENTIONS

These and other limitations of the prior art are addressed by the present invention, which relates to a mechanical arrangement for harvesting energy from activities such as walking or running, using a closed-loop harvesting arrangement embedded within the sole of a shoe.

In accordance with the present invention, a channel for supporting the movement of energy-generating elements is formed as a closed loop of varying cross-section, with selected ones of the elements in the chain configured to have an expandable cross-section that dynamically varies as the elements travel through the channel. By introducing an inert fluid (such as silicone oil) into a region of the channel, a hydraulic force is created in combination with the expandable element that imparts a uni-directional movement of the chain within the closed-loop channel.

In accordance with one embodiment of the present invention, a closed-loop apparatus for converting mechanical energy into electrical energy has been created that utilizes a closed-loop channel including sections of different cross-section (including a first group of sections having a constrained cross-section and a second group sections having an enlarged cross-section). An energy-producing configuration (such as coils and/or electrodes) is formed to surround at least a portion of the channel. A closed-loop chain of energy-producing elements is positioned in channel such that when the chain moves along the channel, the mechanical motion generates electrical energy. The chain is formed to include a set of expandable assemblies that change in dimension as they pass through the different cross-section areas of the channel. An inert fluid is injected into the channel at one or more locations by a mechanical force, resulting in the creation of a pressure-induced force differential that initiates and maintains the movement of the chain with respect to the channel.

By using a closed-loop channel with a varying cross-section and forming a chain that moves within the channel having biasing elements with a changeable cross-section, a more compact energy harvesting arrangement can be created than possible with prior art arrangements that require the use of a linear channel and rely on back-and-forth motion of the chain within the linear channel.

Advantageously, the configuration of the present invention is able to sustain a smooth, continuous motion of the chain within the closed-loop channel by inertia for a period of time after the hydraulic actuation of the chain stops. This additional motion thus creates additional energy even in the absence of the hydraulic motion.

The expandable assemblies disposed at various locations along the chain may be formed of a variety of different components and the ability to expand/contract controlled by different actions. For example, the expandable assemblies may be formed of magnetically-controlled elements (using attractive or repulsive forces), elastic polymer elements, spring-loaded elements, or the like.

All of these advantages are thus considered to extend the power generation time, leading to an improvement in energy harvesting efficiency.

Other and further advantages and features of the present invention will become apparent during the course of the following discussion and by reference to the related drawings.

BRIEF DESCRIPTION OF THE DRAWINGS

Referring now to the drawings, where like numerals represent like elements in several views.

DETAILED DESCRIPTION

As will be described in detail below, the present invention addresses various problems of previous microfluidic-based energy harvesting arrangements, disclosing a new closed-loop energy harvesting apparatus that utilizes hydraulic actuation and allows for continuous, revolving motion of a chain of energy-producing elements within an energy-producing channel. A significant aspect of the present invention is associated with the use of specially-designed expandable chain elements that change in cross-section as they move within a variable cross-section channel. The expandable chain elements allow for efficient conversion of a unidirectional flow of an inert fluid entering the channel into a smooth, continuous revolving motion of the complete chain of energy-producing elements.

Figure 1:
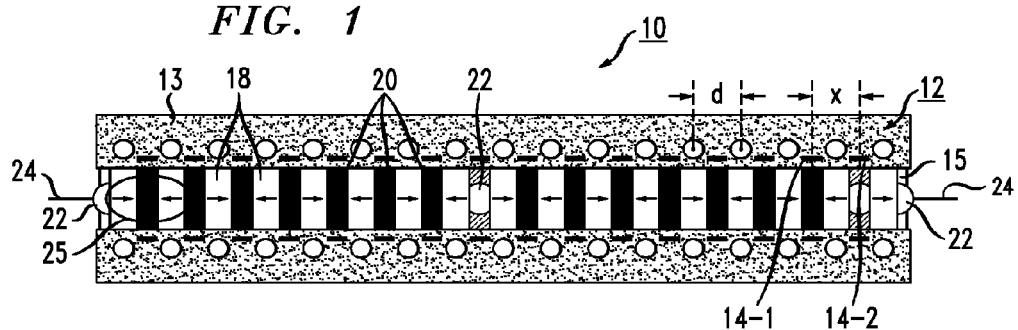
FIG. 1 is a cross-sectional view of an exemplary energy harvesting system based on a chain of energy-producing elements that moves in a channel surrounded by elements capable of creating electromagnetic and electrostatic energy by this movement.
Figure 2:
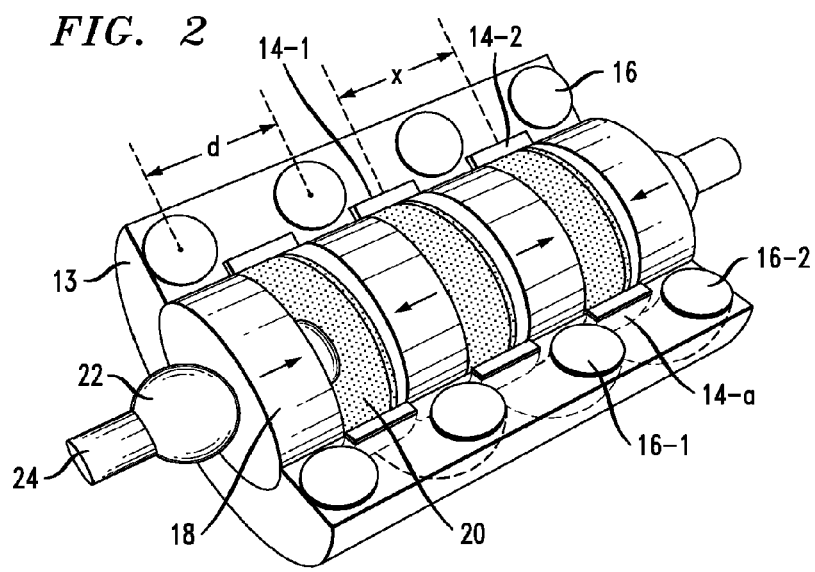
FIG. 2 is an isometric view of a portion of the arrangement of FIG.

Prior to describing the details of providing unidirectional movement of an energy-harvesting, closed-loop chain by using expandable chain elements in accordance with the present invention, it is important to understand the overall operational concepts of a microfluidic-based energy harvesting system, as developed by the inventors and disclosed in the above-cited references. FIG. 1 is a cross-sectional view of an exemplary energy harvesting system 10, based on a "chain" moving within a "channel". The chain is formed of a plurality of microfluidic conductive elements and a plurality of magnetic disks disposed in an interdigitated arrangement. Surrounding the channel is a plurality of electrodes and a plurality of conductive coils that are also interleaved. Therefore, by moving the chain within the channel so as to align the conductive microfluidic droplets with the electrodes and the magnetic disks with the coils, the energy harvesting arrangement is capable of creating both microfluidic-based electrostatic energy and electromagnetic energy, respectively. FIG. 2 is an isometric view of a portion of the arrangement of FIG. 1.

In this particular configuration, energy harvesting system 10 includes a hollow channel 12, with a plurality of dielectric-coated electrodes 14 and a plurality of coils 16 embedded within a material 13 used to form channel 12, with the plurality of coils 16 surrounding hollow center 15 of channel 12. Electrodes 14 and coils 16 are disposed in an interleaved configuration along channel 12, with a single electrode 14-$a$ disposed between an adjacent pair of coils 16-1 and 16-2. The pitch of the plurality of coils 16, defined as the spacing d between the center of adjacent individual coils 16-1 and 16-2, is essentially constant in his particular configuration. Similarly, the spacing x between adjacent electrodes 14-1 and 14-2 is essentially constant. As a result, a well-controlled, known amount of energy can be reproducibly created with system 10.

Continuing with the description, energy harvesting system 10 further comprises a plurality of magnetic rings 18 and a plurality of energy-producing droplets 20 disposed in an alternating configuration within the hollow inner region 15 of channel 12. Neighboring magnetic rings 18 are magnetized through their thickness in opposite polarities (as particularly shown by the arrows in FIG. 2).

Figure 3:
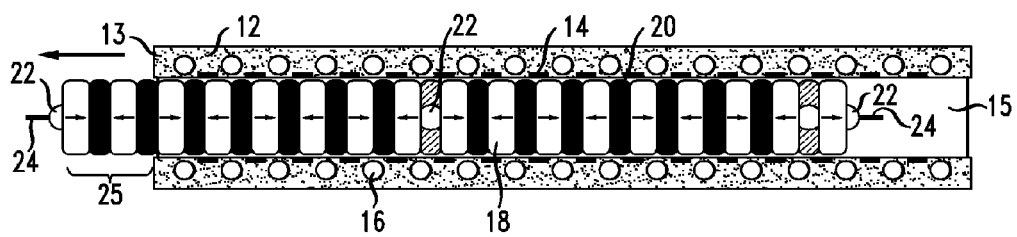
FIG. 3 is a view of the system of FIG. 1, showing the movement of the chain with respect to the channel.

In order to maintain a desired, fixed spacing between adjacent magnetic rings 18, a plurality of spacers 22 is included in system 10 as shown, where droplets 20 fill the region surrounding spacers 22. The plurality of magnetic rings 18, spacers 22 and droplets 20 are connected by a single, centrally disposed flexible rod (e.g., "string") 24, to form what is referred to at times hereinafter as an energy-producing "chain" 25. The various elements disposed along rod 24 are affixed thereto in a manner such that they are permitted to rotate about rod 24, but not slide along rod 24. Chain 25 is itself formed to slide, as a single "fixed" unit, along channel 12 (see FIG. 3). As described in detail in our above-referenced patents, this mechanical movement of chain 25 results in the creation of electrical energy as magnetic rings 18 move within the plurality of coils 16 (creating electromagnetic energy) and droplets 20 move to overlap dielectric-coated electrodes 14 (creating electrostatic energy). FIG. 3 illustrates, in exaggerated form, the movement of chain 25 with respect to channel 12.

In one configuration of the embodiment of FIG. 1, the energy produced by the electromagnetic portion of energy harvesting system 10 can be independently utilized (at least partially, or perhaps fully) to power an electric load (i.e., a device such as a mobile telephone or the like). In the case where the electromagnetic portion of energy harvesting system 10 is fully utilized to power an electric load, the bias voltage required for energy generation by the electrostatic portion of system 10 can be supplied by an external source, as used in prior art arrangements. The flexibility in configuring this hybrid arrangement of energy harvesting system 10 to include both an electromagnetic portion and an electrostatic portion thus allows the user to tailor the arrangement as best-suited for a particular purpose.

Moreover, it is contemplated that the configuration as shown in FIGS. 1-3 may be simplified to create either an "electrostatic-only" embodiment (utilizing a chain of microfluidic droplets passing through a channel surrounded by dielectric-coated electrodes) or an "electromagnetic-only" embodiment (utilizing a chain of magnetic elements passing through a channel surrounded by a conductive coil).

While the above-described energy generation methods have proven the ability to generate useable amounts of electrical energy (on the order of watts) from harvesting mechanical energy (such as human locomotion), some shortcomings still remain. In particular, no provision is made in any of these arrangements for allowing a continuous, revolving motion of the chain of energy-producing elements within the energy-producing channel. That is, the arrangements created to date rely on reciprocal motion to shift the positioning of the chain elements with respect to the channel by creating a pressure differential between separate points along the channel to impart movement to the chain.

Uni-directional, revolving motion of an energy-producing chain is considered to have a number of important advantages over other types of motion (such as, for example, the reciprocating motion mentioned above). In particular, the ability to create a revolving motion of the energy-producing chain around a circular channel would allow for the use of energy-producing chains and channels with substantially shorter length than linear arrangements dependent on reciprocal motion, thus enabling a more compact design of the harvester device.

Figure 4:
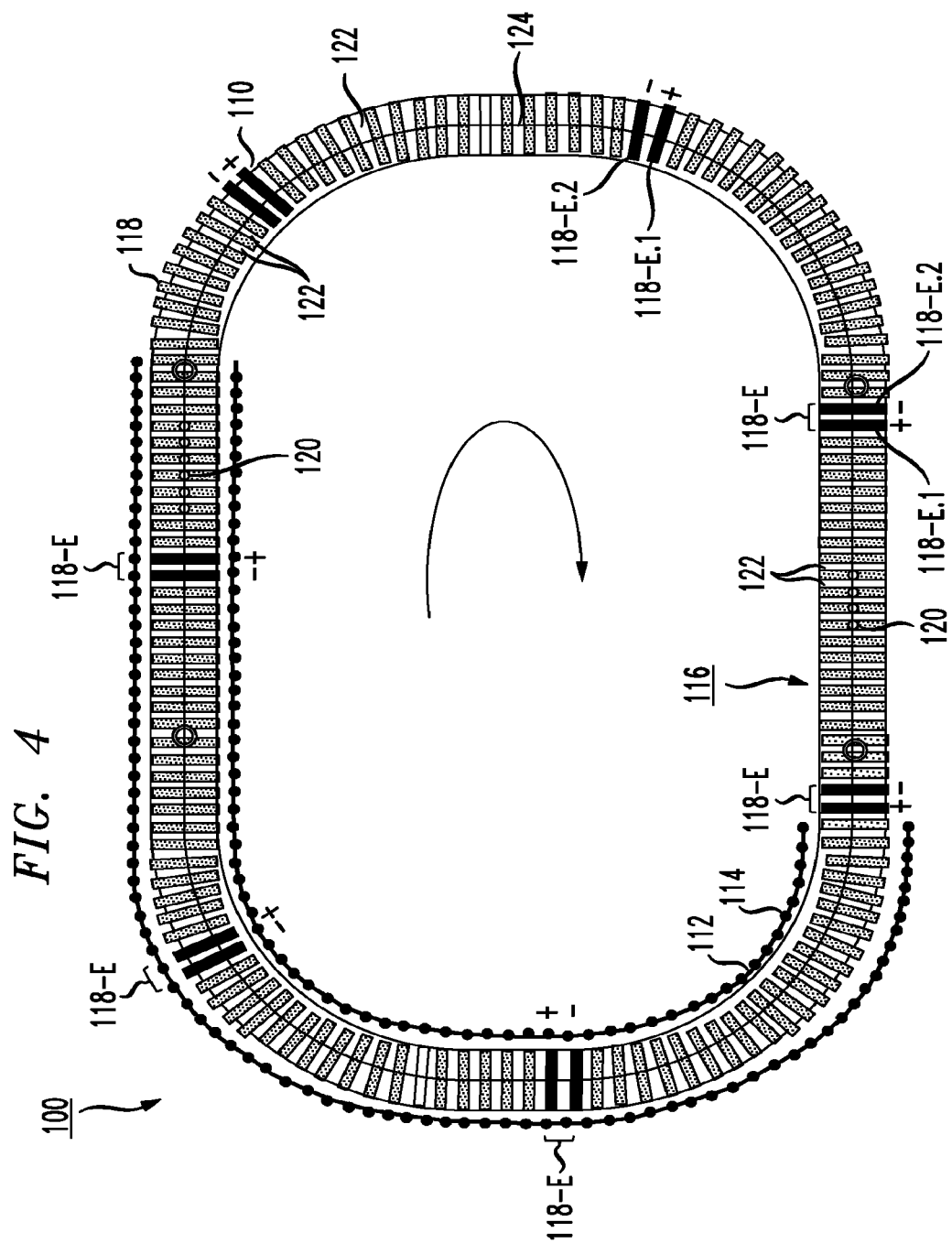
FIG. 4 is a cut-away top view of an exemplary closed-loop energy harvesting system formed in accordance with the present invention that utilizes hydraulic actuation to provide movement of the energy-producing chain with respect to the channel.

FIG. 4 presents a two-dimensional cut-away top view of one exemplary embodiment of a closed-loop energy harvesting arrangement 100 of the present invention, using a closed-loop channel 110 within energy harvesting arrangement 100 for converting mechanical energy into electrical energy. Hydraulic activation is used to move the energy-producing chain with respect to the energy-producing channel, creating a uni-directional, revolving motion of the chain with respect to the channel. As shown, arrangement 100 includes three major subsystems—(1) closed-loop channel 110; (2) energy-producing components in the form of conductive energy-producing electrodes 112 and conductive energy-producing coils 114 disposed around at least a portion of closed-loop channel 110; and (3) a chain 116 disposed within closed-loop channel 110 and including a plurality of magnetic rings 118 interleaved with a plurality of spacers 120, with microfluidic droplets 122 positioned between the magnetic rings.

It is to be understood that the configuration as shown in FIG. 4 may be similarly modified as described above to be either an "electrostatic-only" or an "electromagnetic-only" arrangement, as long as an expandable assembly as formed in accordance with the present invention is included along the chain.

In particular, the elements forming chain 116 are disposed along a central, flexible rod ("string") 124 and attached thereto in a manner such that they remain fixed in place. Hydraulic activation, as described in detail below, is used to initiate the movement of chain 116 with respect to closed-loop channel 110, thus creating electromagnetic and/or electrostatic energy in the same manner as described above in association with FIGS. 1-3 (and fully explained in our patents referenced above).

In accordance with this embodiment of present invention, a subset of magnetic rings 118 are formed as expandable elements 118-E that change in surface area coverage as they move around closed-loop channel 110. These expandable magnetic elements, in combination with an injected inert fluid (under pressure), provide the hydraulic activation of chain 116 in accordance with the teachings of the present invention. While shown as "magnetic" elements in this embodiment, it is to be understood that the "expandable assemblies" as used in forming the energy-producing chain of the present invention may be formed of any arrangement that allows for the assembly to "expand" when entering a larger-dimensioned portion of the channel and "contract" when entering a smaller-dimensioned portion of the channel. In addition to magnetic-controlled assemblies (using either repulsive or attractive magnetic forces), an expandable assembly may be formed of an elastic polymer element that may be compressed when passing through narrow channels, a spring-loaded arrangement of elements, or the like. The following discussion describes the use of magnetic expandable elements for the sake of illustration only, and the scope of the invention should not be considered as limited to this embodiment only.

In the view of FIG. 4, expandable magnetic elements 118-E are shown as pairs of oppositely-poled components 118-E.1 and 118-E.2, with expandable elements 118-E disposed at various locations as shown along chain 116. These expandable elements result in creating the hydraulic actuation necessary to impart and maintain unidirectional movement of chain 116 around closed-loop channel 110. Importantly, there is no spacer 120 between these elements, thus creating a situation where a repulsive magnetic force between the adjacent elements is continuously present.

As will be described in detail below, and in accordance with the teachings of the present invention, the separate elements forming the pair of oppositely-poled expandable elements 118-E are disposed along flexible rod 124 in a manner where they remain free to rotate but are constrained from moving longitudinally along rod 124. Being oppositely-poled, expandable elements 118-E will naturally repel one another and attempt to move away from one another.

Closed-loop channel 110 is itself formed of sections having different cross-section geometries: (1) a constrained cross-section where expandable elements 118-E are prevented from repelling each other and are held in a "contracted" position; (2) an enlarged cross-section where expandable elements 118-E are free to repel each other and thus rotate to "fill" the enlarged cross-sectional area; and (3) a tapered configuration where the cross-section transitions between the constrained cross-section and the tapered cross-section. As these expandable elements 118-E enter a transition region of closed-loop channel 110 where the cross-section tapers downward into the constrained cross-section, the pair of oppositely-poled components forming element 118-E will be constrained to align with each other (i.e., "contract" back into the original position).

Figure 5:
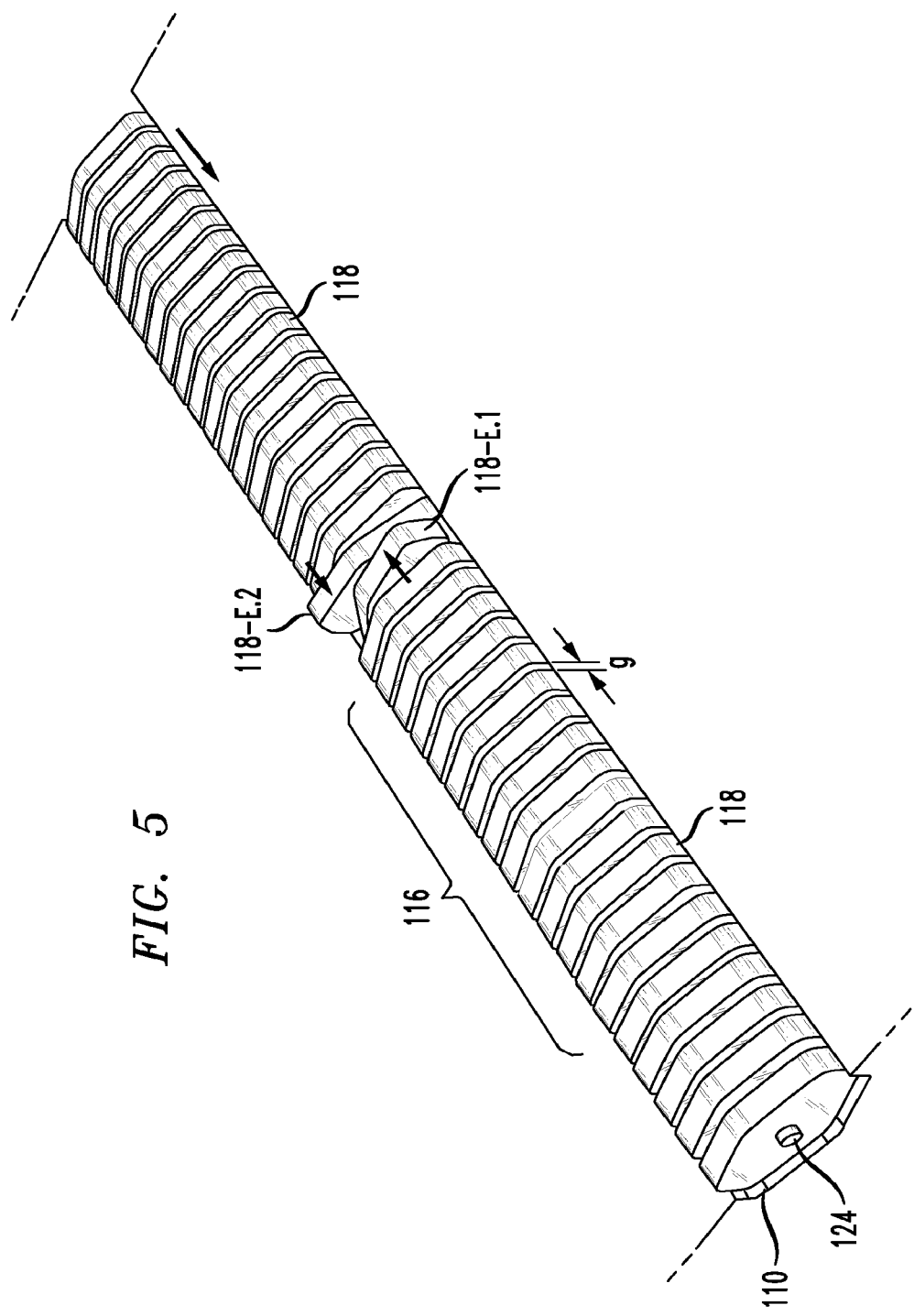
FIG. 5 is an isometric view of a portion of the arrangement of FIG. 4, illustrating the orientation of an expandable magnetic element for use in creating the hydraulic activation of the present invention.

FIG. 5 illustrates a portion of chain 116, showing the positioning of non-expanding magnetic elements 118, as well as an expandable magnetic element 118-E, which comprises a pair of oppositely-poled magnetic components 118-E.1, 118-E.2. In this case, element 118-E is shown in its "expanded" configuration. As with the various arrangements described in our above-referenced patents, non-expanding magnetic elements 118 may be separated by spacers 120 (shown by gap "g" in FIG. 5). The remaining components necessary to form an energy harvesting apparatus (microfluidic droplets, electrodes and coils) are not shown in this illustration for the sake of clarity.

As shown, components 118-E.1 and 118-E.2 are located along an "enlarged" cross-section portion of closed-loop channel 110, where they are free to repel each other. Since their longitudinal movement along rod 124 is prevented, the repulsive force results in these components rotating with respect to each other in the manner shown in FIG. 5. That is, the repulsive force will attempt to move the components into an orthogonal position. In this case, component 118-E.1 is shown as rotated counter-clockwise, blocking the right-hand side of channel 110. Component 118-E.2 is shown as rotated clockwise, blocking the left-hand side of channel 110. As explained in detail below, this expansion in cross-section results in increasing a fluid force used to provide hydraulic actuation and maintain a uni-directional movement of chain 116 within closed-loop channel 110.

Figure 6:
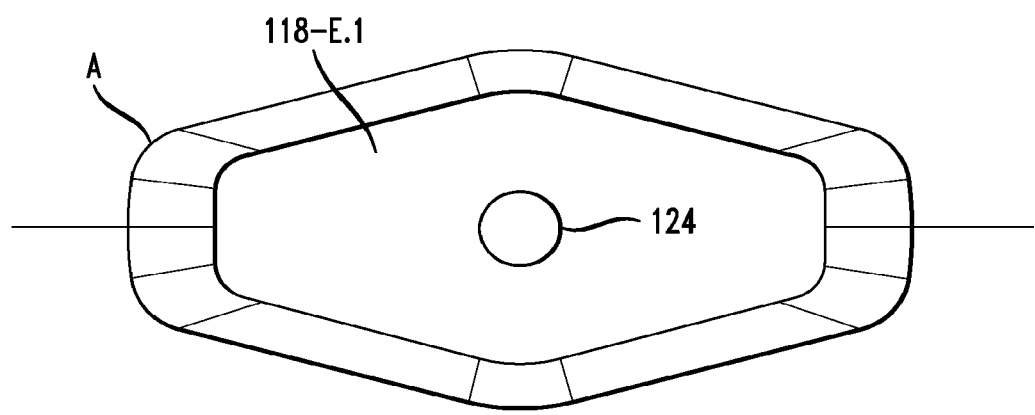
FIG. 6 is a cross-sectional view of a constrained portion of the channel in the energy harvesting system of the present invention, the constrained portion having a relatively small cross-sectional area, and also illustrating the positioning of the expandable magnetic element in its contracted orientation.
Figure 7:
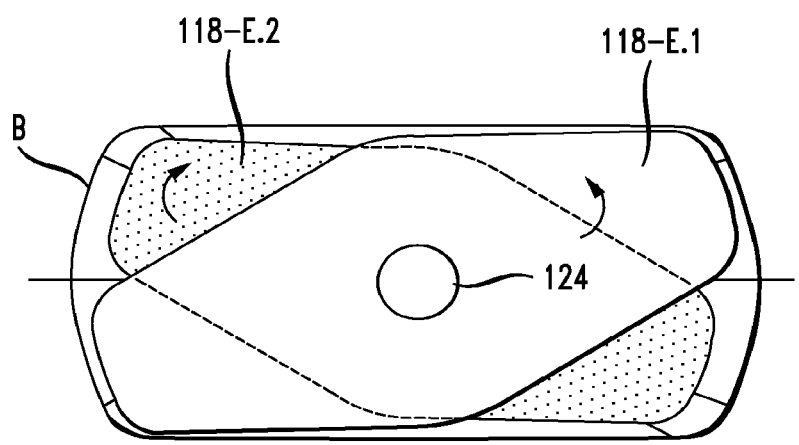
FIG. 7 is a cross-sectional view of an enlarged portion of the channel in the energy harvesting system of the present invention, the enlarged portion having a relatively large cross-sectional area, and also illustrating the positioning of the expandable magnetic element in its expanded orientation.

FIGS. 6 and 7 are cross-sectional views of different portions of closed-loop channel 110, showing the difference in cross-sectional area of different portions of closed-loop channel 110 as used to permit movement of expandable magnetic elements 118-E to "expand" and "contract" as they move along closed-loop channel 110. FIG. 6 is a cut-away view of a portion of closed-loop channel 110 that exhibits the "constrained" cross-section described above (defined as perimeter A in FIG. 6). In all portions of closed-loop channel 110 with this dimension, expandable elements 118-E will remain in their "contracted" position; that is, with the individual components forming the expandable element aligned with one another. In this particular view, therefore, only component 118-E.1 is visible, and the aligned component of components 118-E.1 and 118-E.2 cover only a relatively small cross-sectional surface area.

FIG. 7 is a cut-away view of a portion of closed-loop channel 110 with an enlarged cross-section (shown as perimeter B in FIG. 7). The enlarged cross-section of this portion of closed-loop channel 110 allows for the separate components forming expandable elements 118-E to repel each other, in this case resulting in component 118-E.1 rotating counter-clockwise about rod 124 and component 118-E.2 rotating clockwise about rod 124. Clearly, this rotation of the repelling components results in "expanding" the overall coverage of element 118-E to fill this larger cross-sectional surface area.

Figure 8:
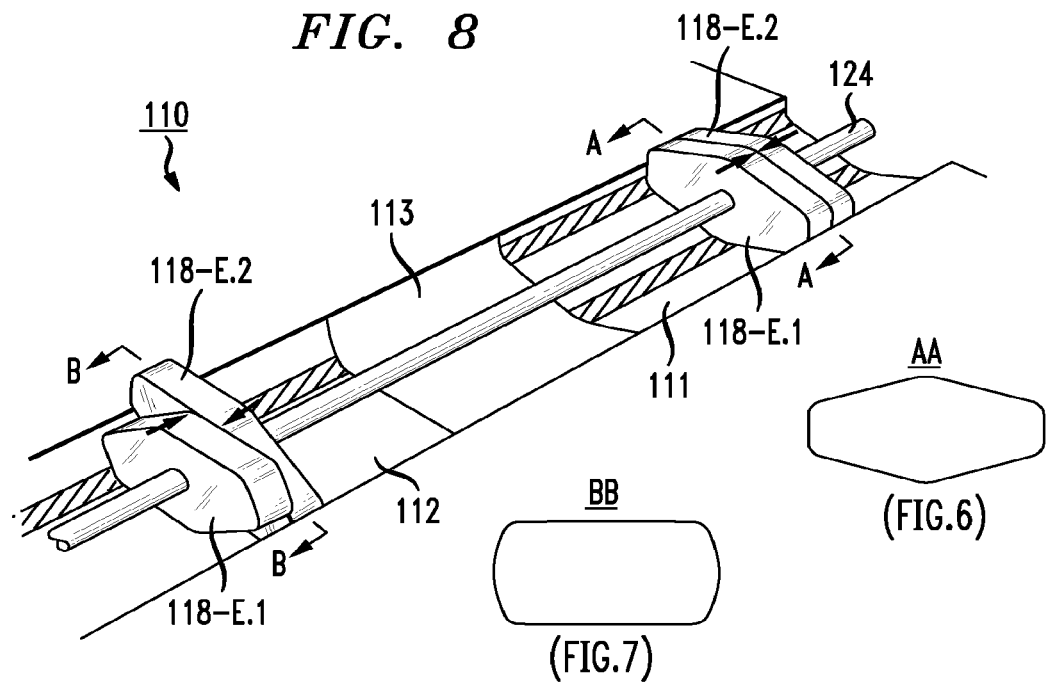
FIG. 8 is an isometric view of a portion of the variable-dimensioned closed-loop channel in the energy harvesting system of the present invention, illustrating in particular the different displacements of the expandable magnetic element in the various sections of the channel.

FIG. 8 is an isometric view of a portion of closed-loop channel 110, showing a first region 111 having the constrained cross-section configuration, a second region 112 having the enlarged cross-section configuration and a third region 113 having the "transition" (tapered) cross-section between the first and second regions 111 and 112. Again, for the sake of clarity, the various components associated with harvesting mechanical energy are not shown in FIG. 8, which illustrates only expandable elements 118-E and their relative orientations within constrained region 111 and enlarged region 112.

In accordance with the present invention, separate components 118-E.1 and 118-E.2 are oppositely poled, as indicated by the opposing arrows on these components in FIG. 8. Therefore, a constant repulsive force exists and tries to move these components apart. Referring to FIG. 8, it is shown that the pair of components forming expandable element 118-E positioned within constrained region 111 remain aligned with each other, filling the smaller cross-sectional area AA (as described above in association with FIG. 6).

As flexible rod 124 revolves around the defined path created within closed-loop channel 110, expandable elements 118-E pass through transition region 113, where the cross-section configuration tapers outward from the AA configuration of FIG. 6 to the enlarged BB configuration of FIG. 7. Therefore, component 118-E.1 will begin to rotate with respect to component 118-E.2, until they form the "expanded" configuration as shown within expanded region 112 of FIG. 8.

Figure 9:
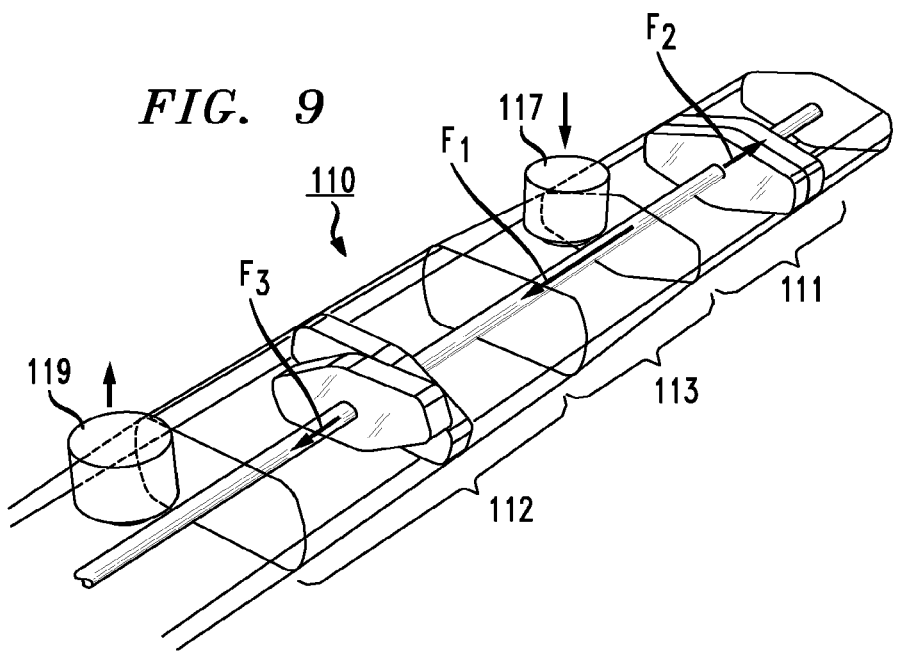
FIG. 9 is an alternative view of the arrangement as shown in FIG. 8, illustrating in detail the creation of the hydraulic force as used to move the chain within the channel of the energy harvesting system.

Therefore, in accordance with the present invention, by introducing an inert fluid under pressure to channel 110, the pressure-created force differential between the fluid force on the "expanded" pair of elements 118-E and the "contracted" pair of elements 118-E will bias the motion of chain 116 within channel 110, creating a net hydraulic force that maintains a constant, revolving motion of chain 116 in one direction. FIG. 9 illustrates the hydraulic actuation concept of the present invention, using these expandable magnetic elements to create a force differential and maintain unidirectional movement of a chain of energy-producing elements within an energy-producing channel. All non-expanding element assemblies are again removed for clarity.

As shown, an inert fluid (such as silicone oil) enters closed-loop channel 110 through an inlet port 117. The pressure created by the presence of fluid creates force $F_1$ acting on the "expanded" pair of elements 118-E1 located within enlarged region 112 of channel 110. Similarly, this fluid creates a force $F_2$ on the contracted pair of elements 118-E2 located within constrained region 111. Inasmuch as the surface area associated with the expanded pair of elements 118-E1 is greater than the surface area associated with the contracted pair of elements 118-E2, force $F_1$ is greater than force $F_2$. The resultant non-zero force $F_3$ acting on chain 116 is therefore in the same direction as $F_1$ (i.e., $F_3=F_1-F_2$), where this non-zero resultant force $F_3$ (the hydraulic force) causes chain 116 to slide along closed-loop channel 110 in the direction shown by arrow $F_3$. An outlet port 119 for drawing the fluid out of closed-loop channel 110 is also shown in FIG. 9.

Figure 10:
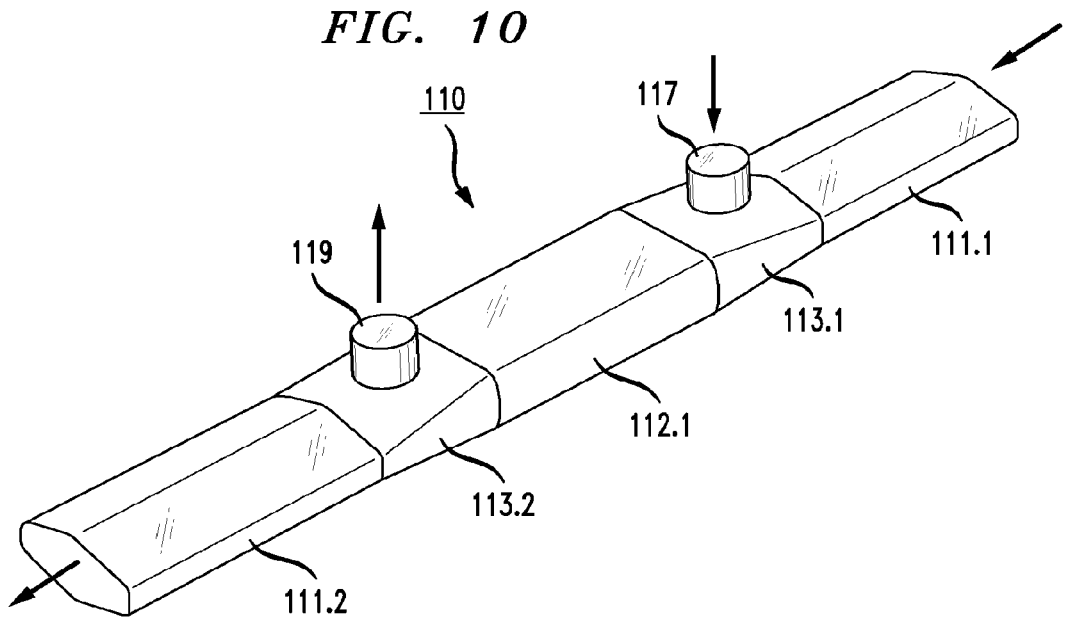
FIG. 10 illustrates a portion of the closed-loop channel similar to that shown in FIG. 9, in this case illustrating the exterior changes in dimension of the closed-loop channel.

FIG. 10 illustrates a portion of closed-loop channel 110 similar to that shown in FIG. 9, in this case illustrating the exterior changes in dimension of closed-loop channel 110 as associated with each region. The illustrated portion shows a first constrained region 111.1 (for example, having a cross-section AA as shown in FIG. 8), a first transition region 113.1 (for example, transitioning from a cross-section AA to a cross-section BB), and an enlarged region 112 (for example, having a cross-section BB as shown in FIG. 8). It is within enlarged region 112 that the individual components forming expandable magnetic element 118-E move relative to one another (that is, repel each other) and function with the injected fluid to create the non-zero resultant force $F_3$ that moves the chain in the indicated direction.

Following enlarged region 112 is a second transition region 113.2, in this case tapering inward in cross-section from the BB value of region 112 to the AA value of region 111, with a second constrained region 111.2 positioned at the output of second transition region 113.2. Inlet port 117 and outlet port 119, used to introduce and remove the fluid from region 112 of closed-loop channel 110 is also shown in this view.

It is to be understood that this same geometry is used to form the complete closed loop structure of channel 110. Moreover, channel 110 is formed of a flexible material so that movements such as human locomotion can be used to initiate the revolving motion of chain 116 within closed-loop channel 110. Various deployments of the closed-loop energy harvesting system of the present invention in situations utilizing human locomotion will be described hereinbelow in association with FIGS. 23-25.

Figure 11:
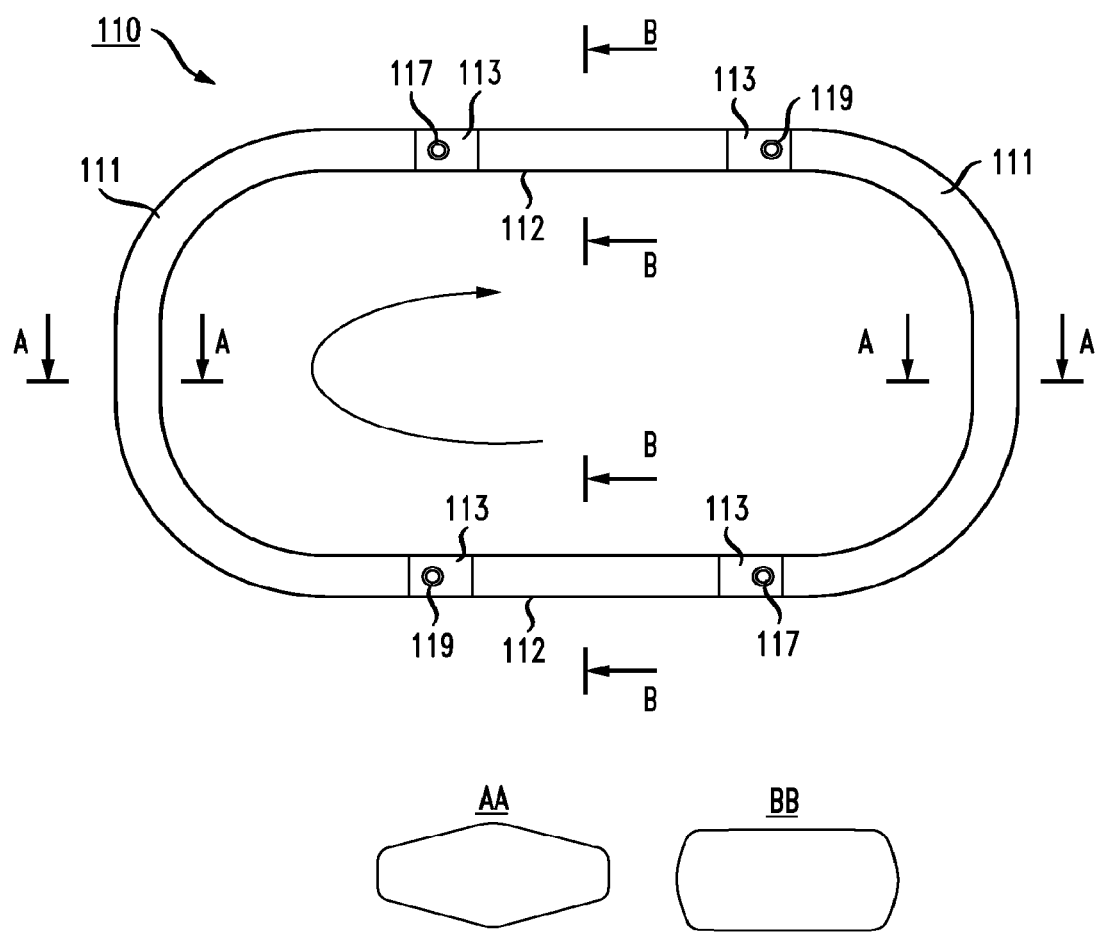
FIG. 11 is a simplified top view of an exemplary configuration of a closed-loop channel that may be used in a energy harvesting system formed in accordance with the present invention.

Returning to the introductory description of the operation of the present invention, FIG. 11 is a simplified top view of one exemplary configuration of closed-loop channel 110 for this purpose. In this case, closed-loop channel 110 is shown as comprising a pair of constrained regions 111 of cross section AA, as shown. Also shown is a pair of enlarged regions 112 of cross section BB. Appropriately oriented transition regions 113 are disposed between adjacent regions 111 and 112.

Thus, for the reasons as described above and with reference to FIGS. 9 and 11, when expandable magnetic elements 118-E enter regions 112, the individual, oppositely-poled components forming these elements will repel one another and rotate about rod 124 in a manner that covers the larger cross-sectional area. By introducing an inert fluid into this region, a net force is created on chain 116, providing movement in the direction indicated by the arrow in FIG. 11.

Figure 12:
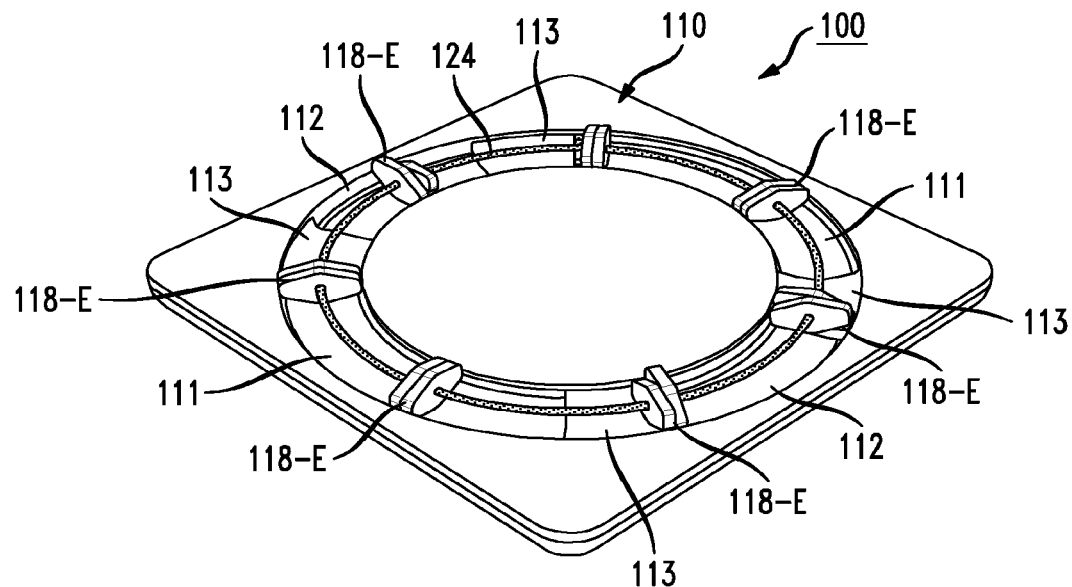
FIG. 12 is a cut-away isometric view of a circular configuration of an exemplary energy harvesting system formed in accordance with the present invention.
Figure 13:
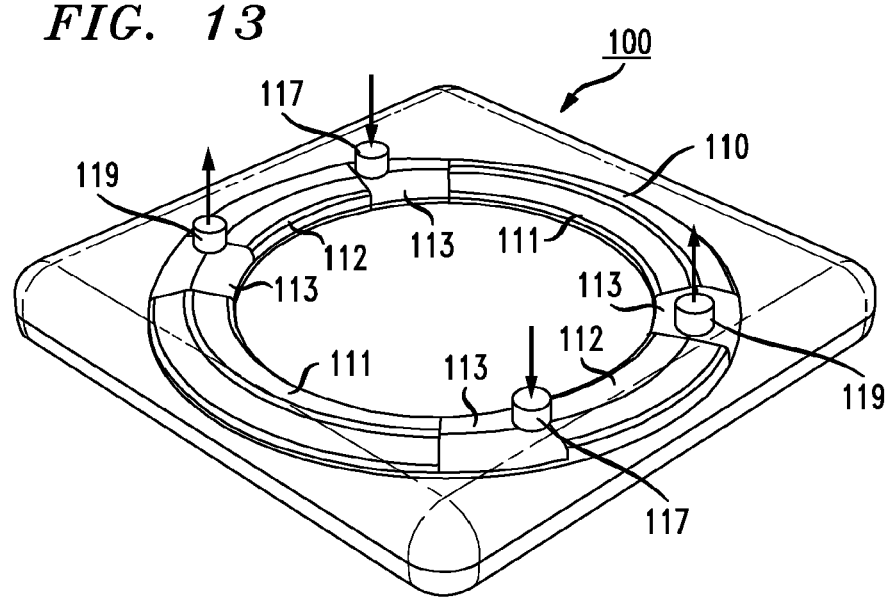
FIG. 13 is another view of the circular configuration of FIG. 12, this view indicating the locations for introducing fluid to create the hydraulic actuation.

FIG. 12 is an isometric view of a circular embodiment of the present invention, again showing only the expandable elements 118-E as disposed at different locations around flexible rod 124. At various locations, different expandable elements are shown in either their "expanded" orientation or their "contracted" (aligned) orientation, imparting the desired directional force in the presence of a fluid as moving within channel 110. As discussed above, the orientation is a function of the cross-sectional area of the specific region where the expandable elements are positioned (i.e., either a constrained region 111 or an enlarged region 112). FIG. 13 is a view of this embodiment as shown in FIG. 12, in this case, indicating the locations of the various inlet ports 117 and outlet ports 119 used to control the presence of the hydraulic activation fluid within channel 110.

One shortcoming with the embodiment of the present invention as described above is the use of expandable magnetic components of an unconventional shape—as necessary to rotate with respect to one another and create different cross-sectional areas.

Figure 14:
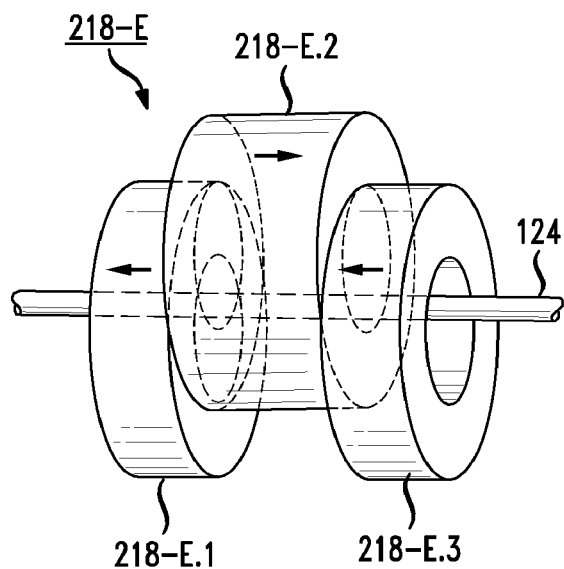
FIG. 14 is an isometric view of an alternative configuration of an expandable magnetic element for use in an energy harvesting system of the present invention, this view showing the element in its "expanded" form.

An alternative embodiment of the present invention has been developed that utilizes standard, cylindrical components while maintaining the ability to create an "expandable" arrangement of magnetic elements that change in surface area coverage based upon the dimensions of different portions of the energy-producing, closed-loop channel. FIG. 14 is an isometric view of an exemplary expandable element 218-E that may be utilized to create the desired force differential and uni-directional chain movement in accordance with the present invention.

Figure 15:
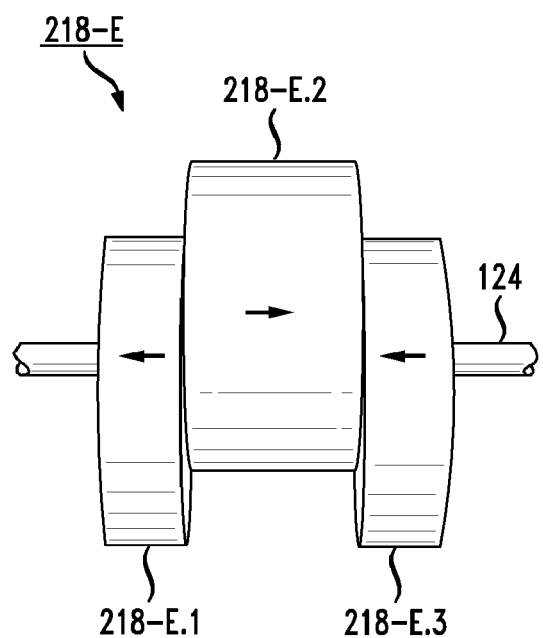
FIG. 15 is a side view of the expandable magnetic element of FIG. 14.

As shown, expandable element 218-E comprises a set of three conventional, cylindrical magnetic components, 218-E.1, 218.2 and 218-E.3 which are affixed to rod 124 in the manner described above (that is, affixed in a manner where they cannot shift longitudinally along rod 124, but are free to shift sideways with respect to one another, at their location along rod 124. As with the embodiment described above, components 218-E.1, 218-E.2 and 218-E.3 are magnetized through their thickness in opposite directions (as shown by the arrows). This magnetization causes the components to experience a repulsive magnetic force that attempts to shift them into a position where their centers are at the maximum distance from each other. As a result of this shifting, magnetic element 218-E "expands" in a way that covers a larger cross-sectional area when in a location along a channel that exhibits this enlarged dimension. FIG. 15 is a side view of the arrangement of FIG. 14, clearly showing the shift in position of component 218-E.2 with respect to components 218-E.1 and 218-E.3.

Figure 16:
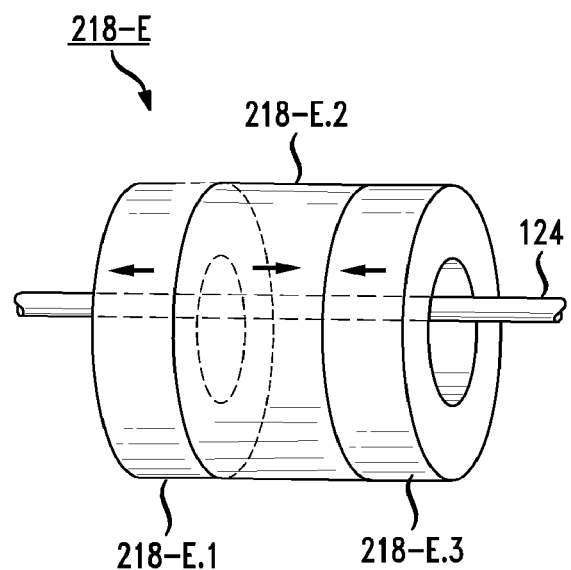
FIG. 16 is an isometric view of the expandable magnetic element of FIG. 14, in this case shown in its "contracted" position with the various components aligned with one another.
Figure 17:
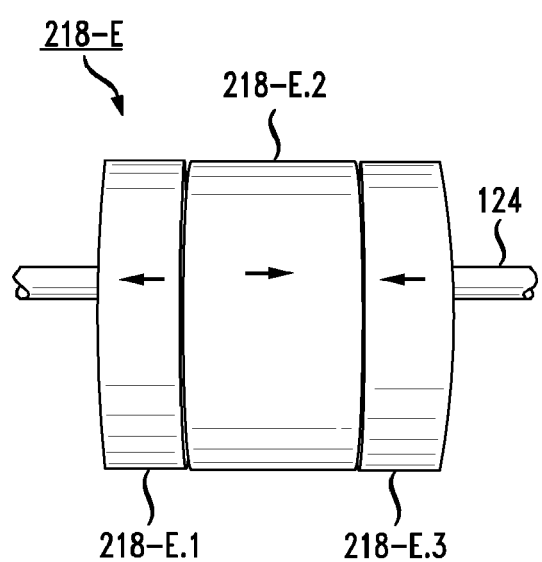
FIG. 17 is a side view of the arrangement of FIG. 16.

Using the similar methodology as described above, a closed-loop channel is formed to have a variable cross-section such that expandable element 218-E as described above changes in cross section (i.e., expands and contracts) as the chain including these elements revolves within the closed-loop channel. FIGS. 16 and 17 show the constrained, contracted positioning of expandable components 218-E.1, 218-E.2 and 218-E.3, in an isometric and side view, respectively.

Figure 18:
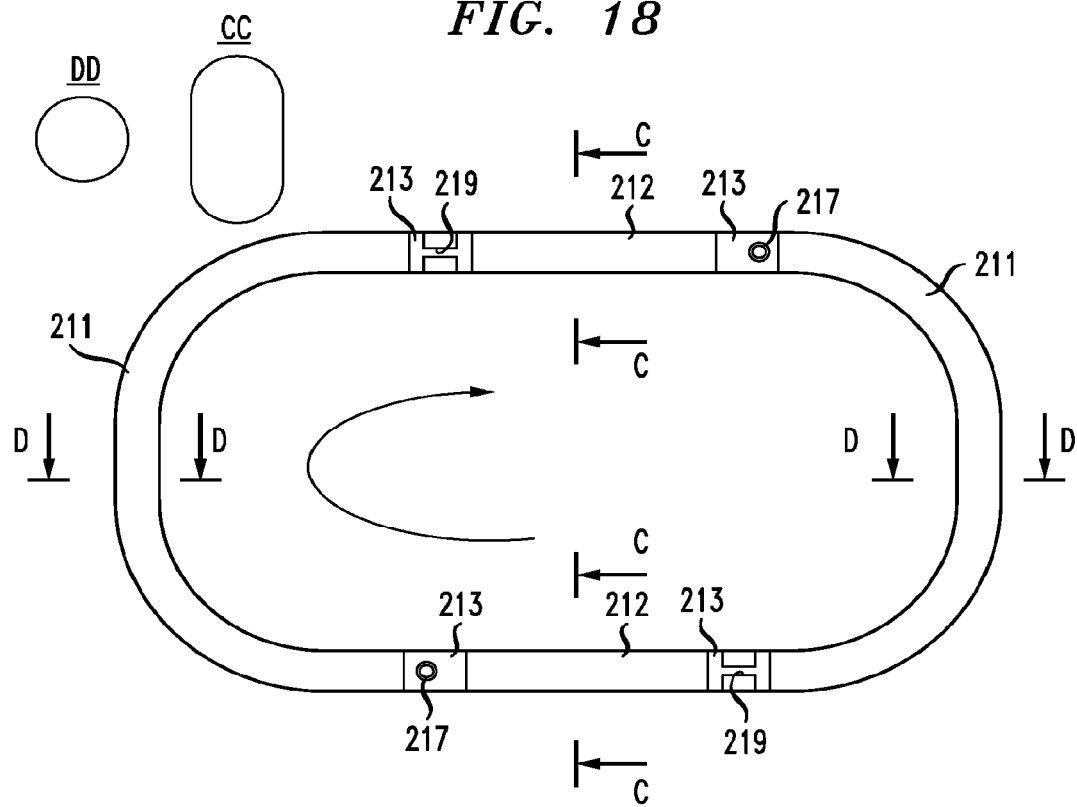
FIG. 18 is a top, simplified view of an exemplary closed-loop channel for use in an energy harvesting system that utilizes the expandable magnetic element as shown in FIGS. 14-17.

An advantage of using conventional, cylindrical shapes as the expandable elements is that the closed-loop channel itself can be formed of a more conventional design. FIG. 18 is a top, simplified view of an exemplary closed-loop channel 210 that comprises sections of conventional circular and oval cross-section. The use of channel segments of these conventional cross sections are able to work with the cylindrically-shaped expandable magnetic element 218-E as shown in FIGS. 14-17. In this particular example, closed-loop channel 210 is shown as including a pair of constrained regions 211 of relatively small, circular cross-section DD and a pair of enlarged regions 212 of relatively large, oval cross-section CC. Inlet ports 217 and outlet ports 219, controlling the flow of fluid required for hydraulic action within channel 210 are also shown in FIG. 18. Although not shown in this view, it is understood that a "chain" of energy-producing, non-expandable elements (magnetic and microfluidic droplets) are disposed along a rod, with expandable elements 218-E disposed at predetermined locations along the chain and used to create and maintain the uni-directional movement of the chain within channel 210. A set of energy-producing coils and electrodes are also disposed to surround a portion of closed-loop channel 210 (see FIG. 4).

Figure 19:
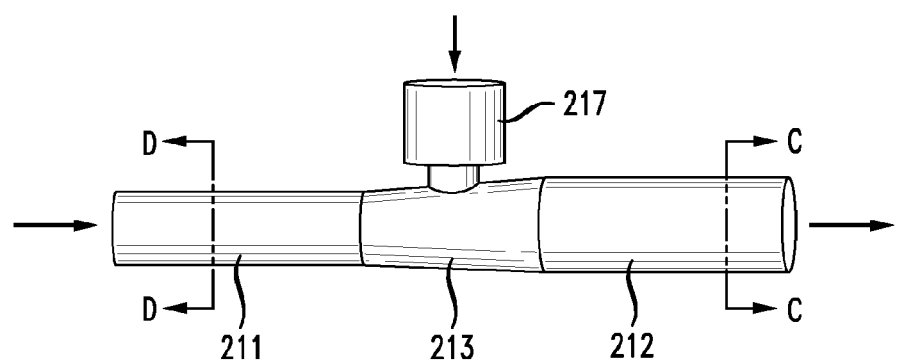
FIG. 19 is a side view of a portion of the channel of FIG. 18, showing the change in cross-section from circular in the constrained portion to oval in the enlarged portion.

FIG. 19 is a cut-away side view of a set of exemplary portions of different cross-section, showing a first region 211 of circular cross-section DD and a second region 212 of oval cross-section CC, with a transition region 213 of an outwardly tapering cross section disposed therebetween. In contrast to the unconventional channel cross-sections associated with the previously-described embodiment of the present invention, the use of circular and oval channel sections is considered to provide a relatively simple embodiment of the present invention.

Figure 20:
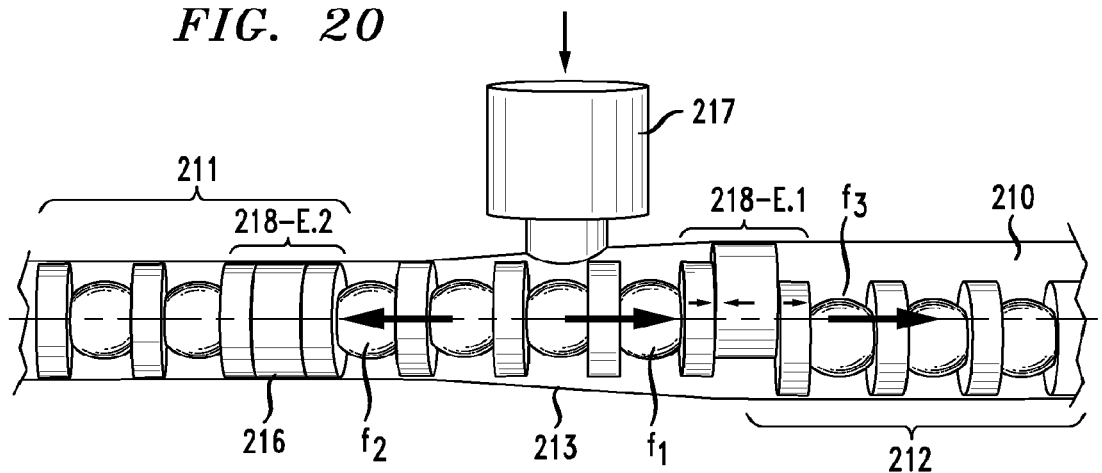
FIG. 20 is an isometric view of the arrangement of FIG. 19, showing the creation of the various forces used to provide hydraulic actuation of the chain within the closed-loop channel.

Using the same principles as described above in association with the previous embodiment, the shifting of expandable elements 218-E creates a resultant force, in the presence of the fluid that provides the desired movement. FIG. 20 is a cut-away side view of channel 210, illustrating a circular region 211, a transition region 213 and an oval region 212, with an inlet port 217 for introducing fluid to channel 210. A first arrow $f_1$ illustrates the force created on expanded element 218-E1 from the pressure of the fluid on the expanded surface area of element 218-D.1. A second arrow $f_2$ illustrates the lesser force created (in the reverse direction) against the "constrained" element 218-E.2. The resultant non-zero force, as shown by arrow $f_3$, creates the hydraulic action that results in the movement of chain 216 in the direction as shown in FIG. 20.

Figure 21:
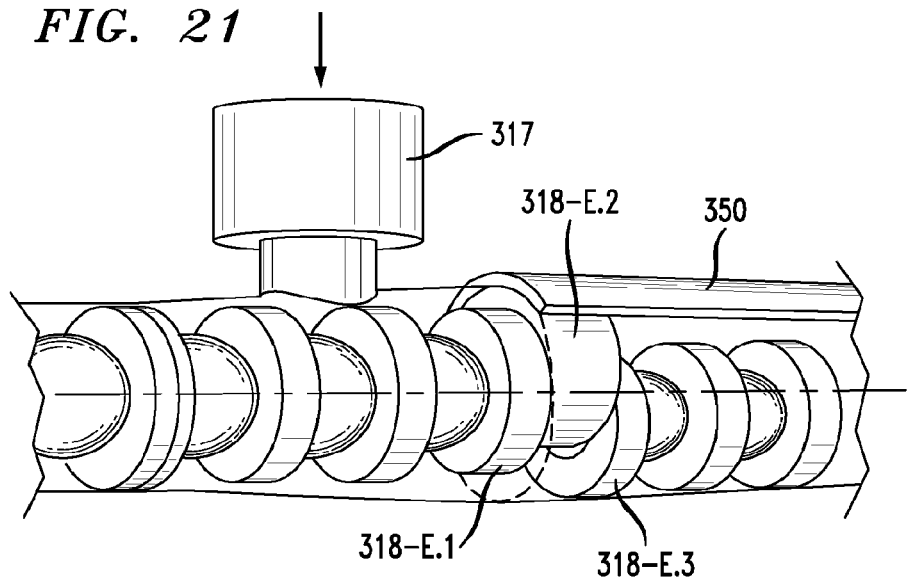
FIG. 21 is a cut-away isometric view of an alternative embodiment of the present invention that uses an attractive magnetic force instead of a repulsive magnetic force to create the expandable magnetic element.

While this embodiment of the present invention may be advantageous for use in many situations where it is desired to use conventionally-shaped components, both this embodiment and the previously-described embodiment are based upon the use of a repulsive magnetic force. The use of a repulsive force causes the expandable elements to exert a force on the walls of the channel (in either the "contracted" or "expanded" portions of the channel), increasing the frictional force and somewhat impeding the movement of the chain of energy-producing elements. FIG. 21 illustrates an alternative embodiment of the present invention that is based on creating an attractive force within those portions of the channel having an enlarged cross-section.

In particular, FIG. 21 is a cut-away isometric view of a portion of a channel 310 having a first portion 311 of a relatively small, circular cross-section and a second portion 312 of a relatively large, oval cross-section (with a tapered region 313 between these two portions). In this embodiment, only central component 318-EC of expandable element 318-E is magnetic. A ferromagnetic plate 350 is disposed over enlarged region 312 and attracts central magnetic component 318-EC, causing it to shift towards the wall of the channel and substantially block the larger, oval cross-section CC of region 312. In contrast, the absence of any ferromagnetic material in constrained region 311 of circular cross section will prevent any shifting of components. Thus, compared to the above-described embodiments, the overall friction experienced by the channel is reduced, since the expanding element assembly 318-E does not exert any substantial force on the channel walls outside of the enlarged region 212.

Figure 22:
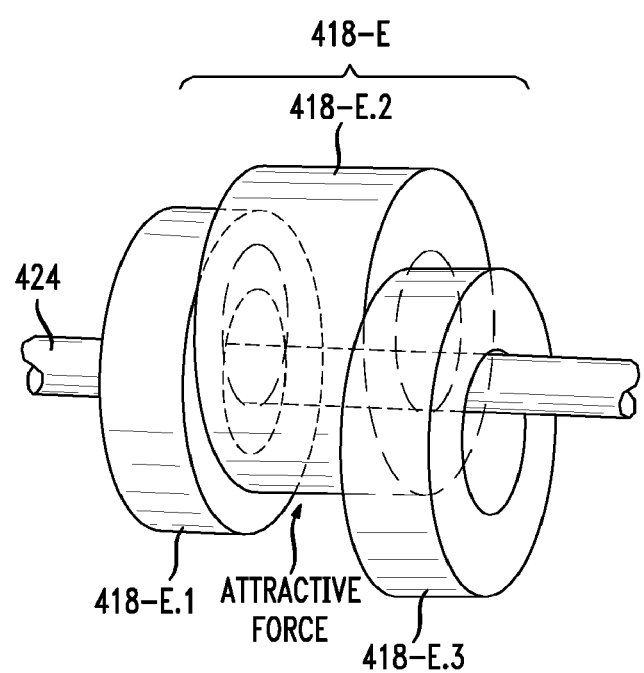
FIG. 22 illustrates yet another configuration of an expandable magnetic element for use in an energy harvesting system, where this configuration is based upon the use of a magnetic rod (string) within the chain.

In yet another embodiment of the present invention, it is possible to utilize a magnetized flexible rod, as shown in FIG. 22. In this case, only the elements forming expandable assembly 418-E are shown. Expandable magnetic element components 418-E.1, 418-E.2 and 418-E.3 are all affixed to flexible rod 424, where in this embodiment rod 424 is made out of ferromagnetic material in a way that allows these components to shift sideways with respect to rod 424 when entering channel regions of larger cross-section (but not move longitudinally). As with the embodiment associated in FIG. 21, the arrangement of FIG. 22 utilizes a single magnetic component 418-E.2. The magnetization of component 418-E.2 causes this component to experience an attractive force that attempts to shift it into a position where it contacts rod 424. Only when in the larger, oval regions of the channel will there be the ability for component 418-E.2 to shift in this manner, thus "expanding" the cross-section of expandable element 418-E. Again, the overall friction experienced by the chain is minimal, since the expanding assemblies do not exert any substantial force on the sidewalls of the channel in the constrained regions of circular cross-section.

While the various energy harvesting configurations described above may find uses in a number of different environments and systems, at least one implementation is in association with human locomotion; in particular, by including a closed-loop energy harvesting system as described above within a shoe, and using human locomotion (heel strike and toe-off) as the mechanical force that is converted into useful electrical energy.

Figure 23:
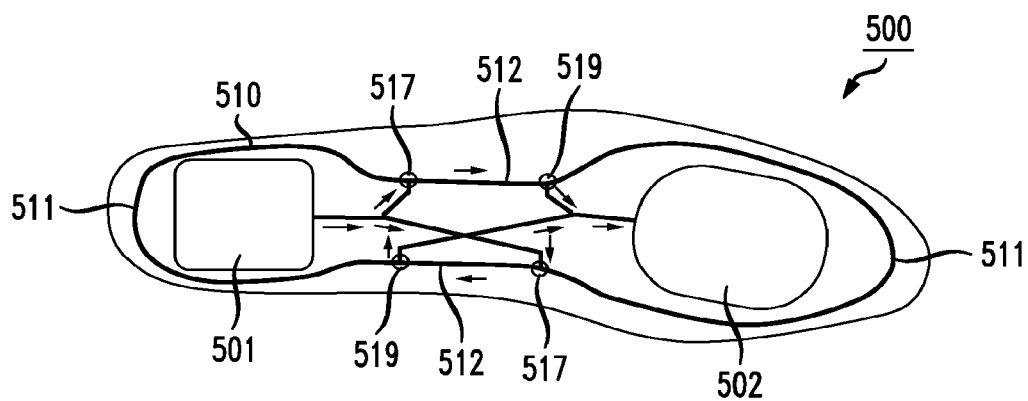
FIG. 23 illustrates an exemplary deployment of a closed-loop energy harvesting system of the present invention within the sole of a shoe.

FIG. 23 illustrates an exemplary deployment of a closed-loop energy harvesting system 500 of the present invention as formed within the sole of a shoe. A closed-loop energy harvesting channel 510 is shown in FIG. 23, where for the sake of clarity, the chain disposed within channel 510 is not shown, nor are the associated electrodes and coils (formed around at least a portion of channel 510) shown in this view. In accordance with the hydraulic activation aspect of the present invention, a pair of flexible chambers 501 and 502 is included in system 500, where each flexible chamber is filled with the inert fluid that is used to create and maintain the unidirectional movement of the chain of energy-producing elements within channel 510.

Flexible chamber 501 is connected via a conduit system 503 to ports 517 of channel 510. Flexible chamber 503 is similarly connected via a conduit system 505 to ports 519 of channel 510. The direction of movement of the chain within channel 510, as well as the movement of fluid flow between chambers 501 and 503 is associated with a "heel strike" mechanical force, which results in the motion as shown. Conversely, during "toe-off", the various arrows are reversed, and the flow is in the opposite direction around closed-loop channel 510. Sections 512 of channel 510 are those having the enlarged cross-section, where in the presence of the fluid (from either chamber 501 or 502, as the case may be), expanded magnetic elements provide the desired force differential that maintains unidirectional movement of the chain.

Figure 24:
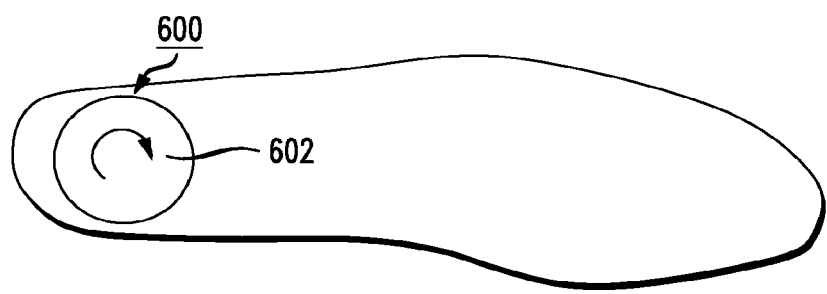
FIG. 24 illustrates an alternative deployment of a different configuration of a closed-loop energy harvesting system of the present invention within only the heel portion of a shoe.
Figure 25:
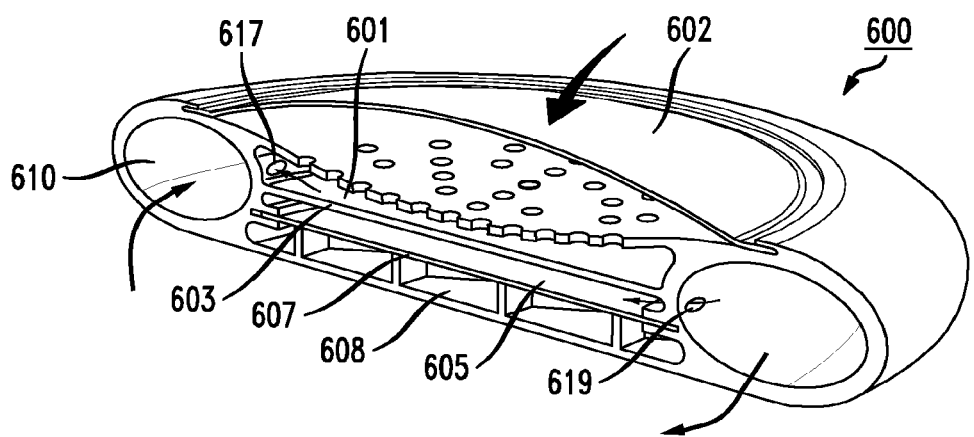
FIG. 25 includes a detailed illustration of the configuration included within the embodiment of FIG. 24.

An alternative deployment of a closed-loop energy harvesting system of the present invention is shown in FIGS. 23 and 24, where a circular embodiment 600 of the present invention is formed completely within the heel portion of a shoe, the compressive force associated with heel strike creating the mechanical energy required to initiate the revolving motion of an energy-producing chain within an energy-producing channel.

FIG. 24 is a cut-away side view of energy-harvesting arrangement 600 as illustrated in FIG. 23. As shown, this configuration utilizes a chamber 601 that is filled with inert fluid. Chamber 601 is restricted by a flexible member 602 disposed over its top surface, and a rigid partition 603 disposed underneath chamber 601. During heel strike, membrane 602 is deflected (as indicated by the arrow) and some of the fluid in chamber 601 is displaced into energy-generating closed-loop channel 610 through ports 617 (only a single port is shown for clarity purposes). The resulting flow of fluid generates revolving motion of the energy-generating chain (not shown) inside channel 610, where as described above channel 610 is formed to include portions of different cross-section and the chain includes expandable magnetic elements to create and maintain the force differential used to generate revolving motion of the chain within channel 610.

Referring again to FIG. 25, it is shown that the movement of the inert fluid around channel 610 results in the fluid exiting channel 610 through exit ports 619 that connect channel 610 to a fluid cavity 605. As shown, fluid cavity 605 is disposed underneath rigid partition 603, with a flexible membrane 607 located across its bottom surface. Membrane 607 is shown as resting on a rigid honeycomb structure 608.

In accordance with this deployment of the present invention, the fluid entering cavity 605 causes stretching and deflection of flexible membrane 607, which temporarily increased the volume of cavity 605 and allows it to accommodate the fluid displaced from chamber 601 through channel 610. During toe-off, the pressure on membrane 607 is released and the elastic force of stretched membrane 607 forces the fluid to flow back into chamber 601, causing a reversal of the revolving motion of the chain within closed-loop energy-generating channel 610.

Although only several preferred embodiments of the present invention have been described in detail, those of ordinary skill in the art should understand that there are various changes, substitutions and alterations that may be made without departing from the scope of the invention. In particular, only one exemplary embodiment of the expanding assembly of chain elements is discussed in detail. Those of ordinary skill in the art should understand that other embodiments of expanding assemblies of elements (for example, based on elastic polymeric materials, mechanical springs, or the like) can be advantageously used without departing from the scope of the invention as defined by the claims appended hereto.

What is claimed is:

1. A closed-loop apparatus for converting mechanical energy into electrical energy comprising
a closed-loop channel formed as a tube have a plurality of sections of different cross-section, including first sections having a constrained cross-section, second sections having an enlarged cross-section and transition sections disposed between adjacent first and second sections to provide for tapering between the constrained cross-section and the enlarged cross-section;
a plurality of coils and a plurality of dielectric-coated electrodes surrounding at least a portion of the closed-loop channel in an interleaved configuration such that a single dielectric-coated electrode is disposed between a pair of adjacent coils of the plurality of coils;
a closed-loop chain formed of alternating regions of non-expanding magnetic material and microfluidic conductive droplets, the chain disposed within the closed-loop channel, the chain further comprising several expandable elements disposed at various locations around the chain, the expandable elements exhibiting a constrained dimension when passing through the first sections of the closed-loop channel and expanding to exhibit an enlarged dimension when passing through the second sections;
at least one port disposed in the channel for introducing a fluid under pressure into the closed-loop channel in a transition region in response to a mechanical compression of the fluid, the fluid creating a hydraulic actuation for moving the chain within the closed-loop channel as a result of a pressure-generated force differential between a force applied to a constrained expandable element and a force applied to an enlarged expandable element, the moving chain creating electromagnetic and electrostatic energy in combination with the plurality of dielectric-coated electrodes and the plurality of conductive coils.

2. A closed-loop apparatus as defined in claim 1 wherein the expandable elements comprise a magnetically-controlled expandable element.

3. A closed-loop apparatus as defined in claim 2 wherein the magnetically-controlled expandable element comprises a pair of oppositely-poled magnetic components disposed adjacent to one another, the pair of oppositely-poled magnetic components having a geometric configuration such that when aligned the expandable element covers the constrained cross-section of the first sections of the closed-loop chain, and when passing through the enlarged cross-section of the second sections, the pair of oppositely-poled elements rotate with respect to each other to create a configuration that covers the enlarged cross-section in the second sections.

4. A closed-loop apparatus as defined in claim 2 wherein the magnetically-controlled expandable element comprises a set of three magnetic components disposed in an oppositely-poled configuration so as to repel against one another, the set of three magnetic components constrained to remain aligned when passing through first sections of the closed-loop chain and a middle component repelling from the remaining components when passing through second sections of the closed-loop chain to create a configuration that covers the enlarged cross-section in the second sections.

5. A closed-loop apparatus as defined in claim 4 wherein the set of three magnetic components comprises a set of three cylindrical components.

6. A closed-loop apparatus as defined in claim 2 wherein the magnetically-controlled expandable element comprises a set of three components, including a magnetized component disposed between a pair of non-magnetized components and the loop includes a magnetic plate disposed over at least a portion of a second section of the closed-loop channel, the magnetic plate attracting the magnetized component as the magnetically-controlled expandable element passes under the magnetic plate, shifting the position of the magnetized component to expand the cross-section of the expandable element in the enlarged second sections.

7. A closed-loop apparatus as defined in claim 2 wherein the magnetically-controlled expandable element comprises a set of three components, including a magnetized component disposed between a pair of non-magnetized components and the chain comprises a magnetic rod, the magnetic rod attracting the magnetized component as the magnetically-controlled expandable element passes under the magnetic plate, shifting the position of the magnetized component to expand the cross-section of the expandable element in the enlarged second sections.

8. A closed-loop apparatus as defined in claim 1 wherein the expandable element comprises an elastic polymer material that contracts in dimension when passing through the constrained, first sections of the closed-loop channel and expands in dimension when passing through the enlarged, second sections of the closed-loop channel.

9. A closed-loop apparatus as defined in claim 1 wherein the expandable element comprises a spring-loaded element that contracts in dimension when passing through the constrained, first sections of the closed-loop channel and expands in dimension when passing through the enlarged, second sections of the closed-loop channel.

10. A closed-loop apparatus as defined in claim 1 wherein the apparatus further comprises a fluid reservoir for holding the inert fluid, the fluid reservoir connected to the port of the channel.

11. A closed-loop apparatus as defined in claim 10 wherein the fluid reservoir is formed of a flexible material that compresses in response to an applied force and expends the fluid under pressure through the at least one port and into the channel.

12. A closed-loop apparatus as defined in claim 1 wherein the inert fluid comprises a silicone oil.

13. A closed-loop apparatus for converting mechanical energy into electrical energy comprising
  a closed-loop channel formed as a tube have a plurality of sections of different cross-section, including first sections having a constrained cross-section, second sections having an enlarged cross-section and transition sections disposed between adjacent first and second sections to provide for tapering between the constrained cross-section and the enlarged cross-section;
  a plurality of separate coils disposed along a longitudinal extent of the channel and formed to surround separate sections of the channel with a predetermined spacing formed between adjacent coils of the plurality of separate coils, the plurality of separate coils embedded within the material forming the tube such that the plurality of separate coils extends along the longitudinal extent of the tube;
  a closed-loop chain formed of spaced-apart regions of non-expanding magnetic material, the chain disposed within the closed-loop channel and further comprising several expandable elements disposed at various locations along around the chain, the expandable elements exhibiting a constrained dimension when passing through the first sections of the closed-loop channel and expanding to exhibit an enlarged dimension when passing through the second sections;
  at least one port disposed in the channel for introducing a fluid under pressure into the closed-loop channel in a transition region in response to a mechanical compression of the fluid, the fluid creating a hydraulic actuation for moving the chain within the closed-loop channel as a result of a pressure-generated force differential between a force applied to a constrained expandable element and a force applied to an enlarged expandable element, the moving chain creating electromagnetic energy in combination with the plurality of separate conductive coils.

14. A closed-loop apparatus as defined in claim 13 wherein the expandable elements comprise a magnetically-controlled expandable element that contracts in dimension when passing through the constrained, first sections of the closed-loop channel and expands in dimension when passing through the enlarged, second sections of the closed-loop channel.

15. A closed-loop apparatus as defined in claim 14 wherein the magnetically-controlled expandable element is configured to utilize a repulsive magnetic force.

16. A closed-loop apparatus as defined in claim 14 wherein the magnetically-controlled expandable element is configured to utilize an attractive magnetic force.

17. A closed-loop apparatus as defined in claim 13 wherein the expandable element comprises an elastic polymer material that contracts in dimension when passing through the constrained, first sections of the closed-loop channel and expands in dimension when passing through the enlarged, second sections of the closed-loop channel.

18. A closed-loop apparatus as defined in claim 13 wherein the expandable element comprises a spring-loaded element that contracts in dimension when passing through the constrained, first sections of the closed-loop channel and expands in dimension when passing through the enlarged, second sections of the closed-loop channel.

19. A closed-loop apparatus for converting mechanical energy into electrical energy comprising
  a closed-loop channel formed as a tube have a plurality of sections of different cross-section, including first sections having a constrained cross-section, second sections having an enlarged cross-section and transition sections disposed between adjacent first and second sections to provide for tapering between the constrained cross-section and the enlarged cross-section;
  a plurality of separate dielectric-coated electrodes surrounding at least a portion of the closed-loop channel with a redetermined spacing formed between adjacent dielectric-coated electrodes of the plurality of separate dielectric-coated electrodes;
  a closed-loop chain formed of spaced-apart regions of microfluidic conductive droplets and the closed-loop chain contains a rod, the chain disposed within the closed-loop channel and further comprising several expandable elements disposed at various locations around the chain, the expandable elements exhibiting a constrained dimension when passing through the first sections of the closed-loop channel and expanding to exhibit an enlarged dimension when passing through the second sections;
  at least one port disposed in the channel for introducing a fluid under pressure into the closed-loop channel in a transition region in response to a mechanical compression of the fluid, the fluid creating a hydraulic actuation for moving the chain within the closed-loop channel as a result of a pressure-generated force differential between a force applied to a constrained expandable element and a force applied to an enlarged expandable element, the moving chain creating electrostatic energy in combination with the plurality of separate, spaced-apart dielectric-coated electrodes.

20. A closed-loop apparatus as defined in claim 19 wherein the expandable elements comprise a magnetically-controlled expandable element that contracts in dimension when passing through the constrained, first sections of the closed-loop channel and expands in dimension when passing through the enlarged, second sections of the closed-loop channel.

21. A closed-loop apparatus as defined in claim 19 wherein the expandable element comprises an elastic polymer material that contracts in dimension when passing through the constrained, first sections of the closed-loop channel and expands in dimension when passing through the enlarged, second sections of the closed-loop channel.

22. A closed-loop apparatus as defined in claim 19 wherein the expandable element comprises a spring-loaded element that contracts in dimension when passing through the constrained, first sections of the closed-loop channel and expands in dimension when passing through the enlarged, second sections of the closed-loop channel.

\* \* \* \* \*